(12) United States Patent
Naidu et al.

(10) Patent No.: US 12,725,193 B2
(45) **Date of Patent: *Sep. 1, 2026**

(54) SYSTEMS AND METHODS FOR INGREDIENT-TO-PRODUCT MAPPING

(71) Applicant: Walmart Apollo, LLC, Bentonville, AR (US)

(72) Inventors: Navin Naidu, San Jose, CA (US); Steven Pui Sum Cheng, Sunnyvale, CA (US); Kartikeya Misra, Foster City, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/760,468

(22) Filed: Jul. 1, 2024

(65) Prior Publication Data

US 2025/0005640 A1 Jan. 2, 2025

Related U.S. Application Data

(63) Continuation of application No. 18/100,089, filed on Jan. 23, 2023, now Pat. No. 12,026,765, which is a continuation of application No. 16/779,474, filed on Jan. 31, 2020, now Pat. No. 11,562,414.

(51) Int. Cl.

| | |
|---|---|
| ***G06Q 30/0601*** | (2023.01) |
| ***G06F 16/2452*** | (2019.01) |
| ***G06N 20/00*** | (2019.01) |
| ***G09B 19/00*** | (2006.01) |

(52) U.S. Cl.
CPC ... *G06Q 30/0627* (2013.01); *G06F 16/24522* (2019.01); *G06N 20/00* (2019.01); *G06Q 30/0603* (2013.01); *G09B 19/0092* (2013.01)

(58) Field of Classification Search
CPC .................................................. G06Q 30/0627
See application file for complete search history.

(56) References Cited

U.S. PATENT DOCUMENTS

| | | | | |
|---|---|---|---|---|
| 2009/0037288 A1* | 2/2009 | Christensen | G06F 16/00 708/133 |
| 2010/0173610 A1* | 7/2010 | Kitazoe | H04W 12/0431 455/411 |
| 2013/0173610 A1 | 7/2013 | Hu et al. | |
| 2013/0204867 A1 | 8/2013 | Lim et al. | |
| 2014/0249966 A1* | 9/2014 | Zaragoza | G06Q 30/0635 705/26.81 |

(Continued)

*Primary Examiner* — Van H Oberly
(74) *Attorney, Agent, or Firm* — DICKINSON WRIGHT RLLP; Hector A. Agdeppa

(57) ABSTRACT

A system including one or more processors; and one or more non-transitory computer-readable media storing computing instructions that, when executed on the one or more processors, cause the one or more processors to perform operations: parsing a hypertext markup language source code from text strings of query strings of a webpage containing ingredients for a recipe; extracting, using an iterative process, the ingredients for the recipe from the query strings of the webpage; mapping recipe products based on quantities or units of measure of the ingredients, as extracted, for the recipe; and automatically adding the recipe products to an electronic shopping cart. Other descriptions are disclosed.

20 Claims, 9 Drawing Sheets

(56) References Cited

U.S. PATENT DOCUMENTS

| | | | | |
|---|---|---|---|---|
| 2015/0135061 | A1 | 5/2015 | Palanichamy et al. | |
| 2015/0339394 | A1* | 11/2015 | Jinq | G09B 19/00 715/776 |
| 2017/0303010 | A1* | 10/2017 | Vehovsky | G06F 3/0484 |
| 2018/0173699 | A1* | 6/2018 | Tacchi | G06F 16/358 |
| 2019/0034542 | A1 | 1/2019 | Ming et al. | |
| 2020/0242303 | A1* | 7/2020 | Hwang | G06F 40/279 |

* cited by examiner

Universal Serial Bus
112
CD-Rom Drive
116
Hard Drive
114
Graphics Adapter
224
Disk Controller
204
Memory ROM/RAM
208
Network Adapter
220
214
System Bus
Other I/O Devices
222
Mouse Adapter
206
Keyboard Adapter
226
CPU
210
Video Controller
202
Mouse
110
Keyboard
104
Monitor
106

900
Model
Database
Product List
Search

Video Server
Interface
Server
907
Webpage
901
902

SYSTEMS AND METHODS FOR INGREDIENT-TO-PRODUCT MAPPING

CROSS-REFERENCE TO RELATED APPLICATIONS

This application is a continuation of U.S. application Ser. No. 18/100,089, filed Jan. 23, 2023, to be issued as U.S. Pat. No. 12,026,765, which is a continuation of U.S. application Ser. No. 16/779,474, filed Jan. 31, 2020, issued as U.S. Pat. No. 11,562,414, each of which are incorporated herein by reference in their entirety.

TECHNICAL FIELD

This disclosure relates generally to ingredient-to-product mapping systems and methods.

BACKGROUND

Many users visit a website searching for a recipe and a corresponding list of ingredients for that recipe. Such a recipe could be published on a website in text or in a video demonstrating a preparation of the recipe. After reading the text or watching the video, in order to be able to prepare the recipe herself, a user visits a second website to manually order corresponding sizes of products that matches quantities of ingredients in the recipe. Such manual ordering requires searching an entire online catalog for the products and can be time consuming and expend many computer resources.

BRIEF DESCRIPTION OF THE DRAWINGS

To facilitate further description of the embodiments, the following drawings are provided in which.

Figure 1:
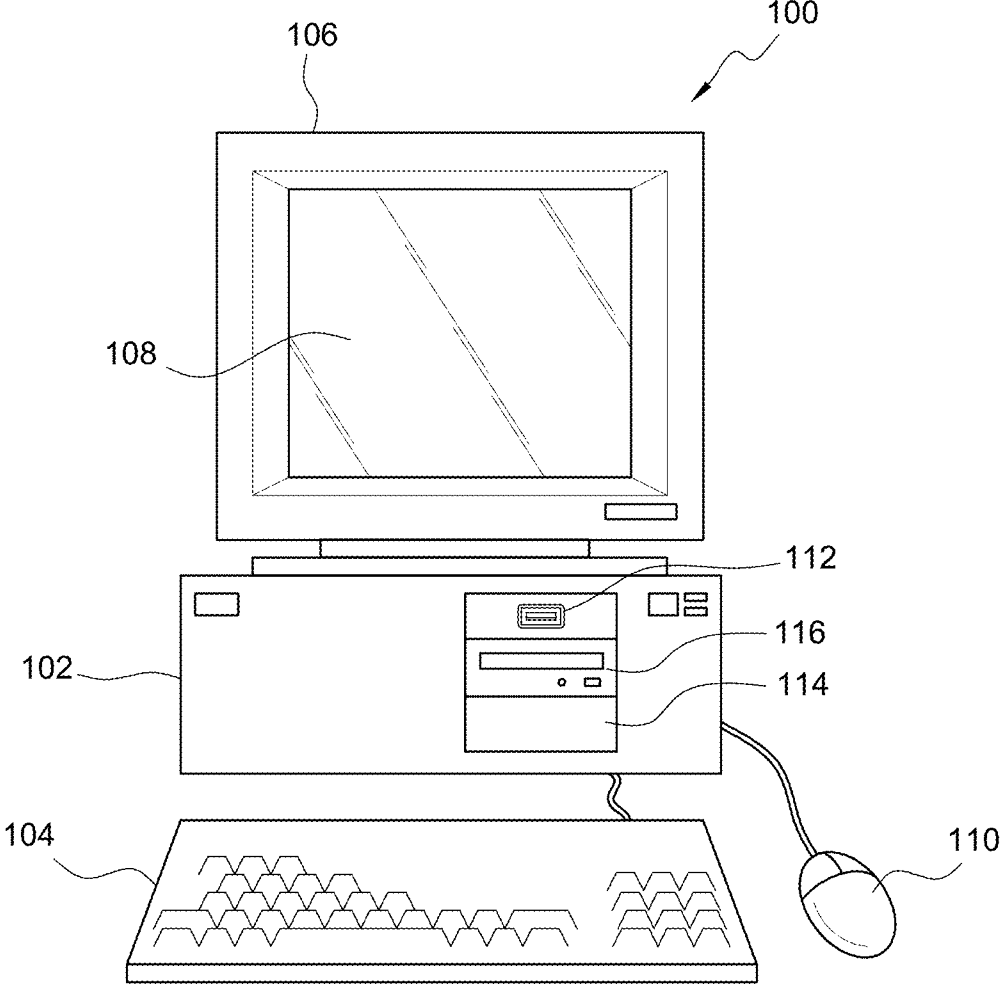
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, or ten seconds.

DESCRIPTION OF EXAMPLES OF EMBODIMENTS

A recipe mapping system can be capable of identifying quantities of each ingredient in a recipe and mapping the ingredients to corresponding products in a catalog. A set of items can be displayed on a user interface and by engaging a single-select option (e.g., single-click option), a user can add the entire set of items to an online basket. The single-select (e.g., single-click) option can be implemented using a predictive platform model.

Figure 2:
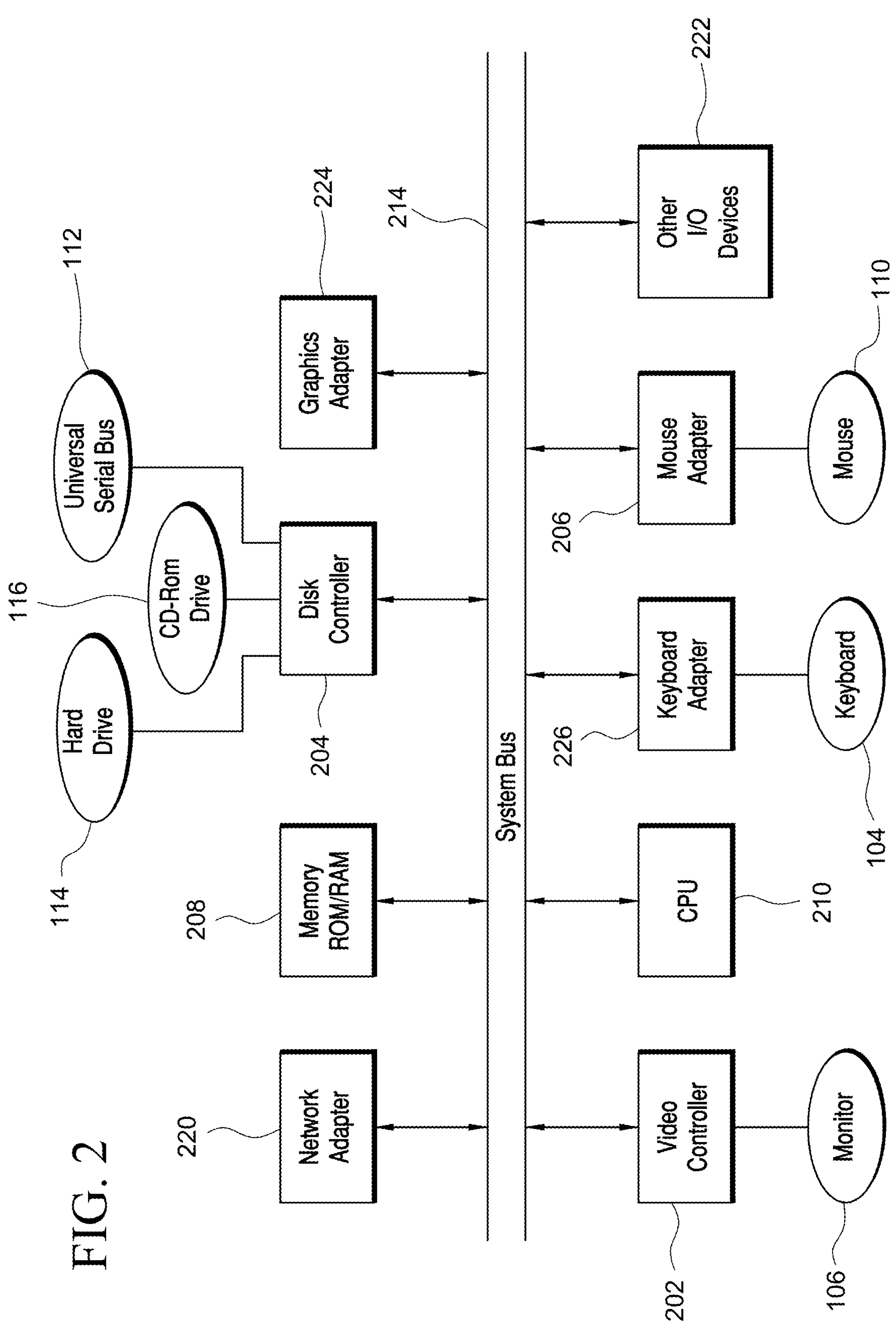
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
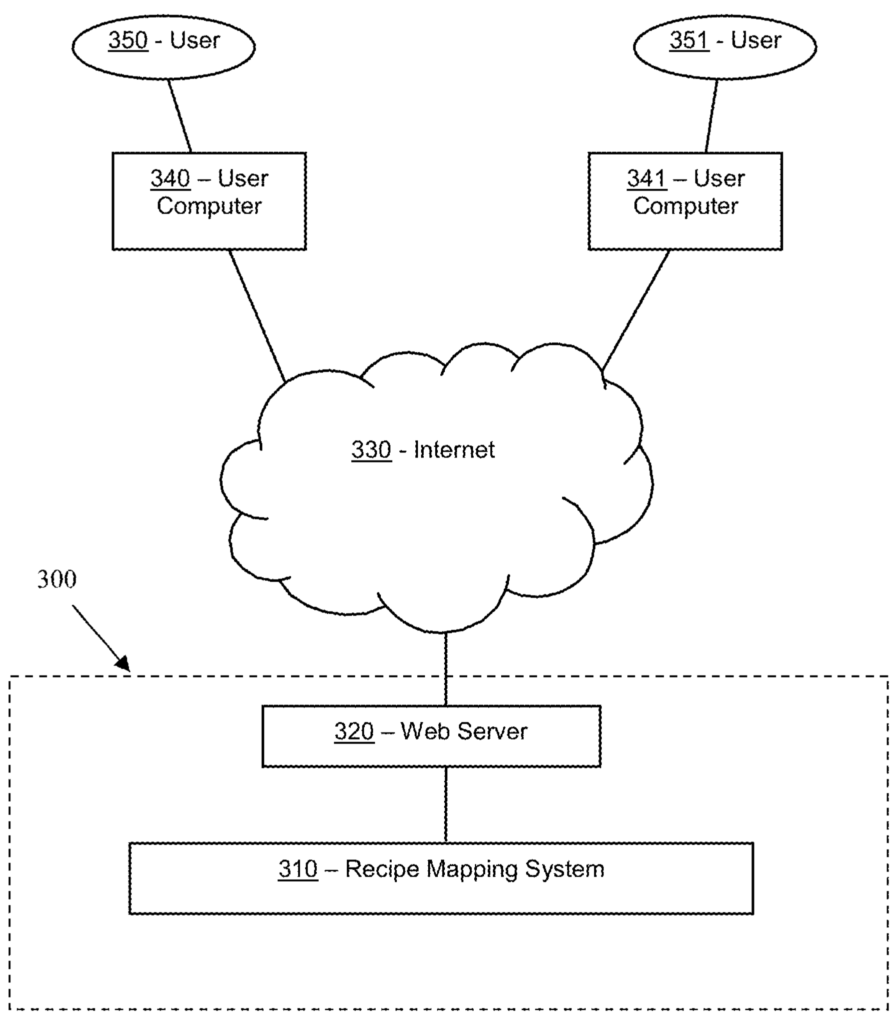
FIG. 3 illustrates a block diagram of a system that can be employed for an ingredient to product mapping system, according to an embodiment.

Turning ahead in the drawings, FIG. 3 illustrates a block diagram of a system 300 that can be employed for mapping a recipe ingredient to a corresponding product from a catalog, according to an embodiment. In many embodiments, system 300 can identify a list of recipe ingredients from a recipe published on a website and map each ingredient and quantity to a corresponding size of a product. In several embodiments, the list of products matching the list of ingredients can include automatically adding the list of products to an electronic cart. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a recipe mapping system 310 and/or a web server 320. Recipe mapping system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, recipe mapping system 310 and/or web server 320 Additional details regarding recipe mapping system 310 and/or web server 320 are described herein.

In a number of embodiments, each of recipe mapping system 310 and/or web server 320 can be a special-purpose computer programed specifically to perform specific functions not associated with a general-purpose computer, as described in greater detail below.

In some embodiments, web server 320 can be in data communication through Internet 330 with one or more user computers, such as user computers 340 and/or 341. Internet 330 can be a public or private network. In some embodiments, user computers 340-341 can be used by users, such as users 350 and 351, which also can be referred to as customers, in which case, user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In some embodiments, an internal network that is not open to the public can be used for communications between recipe mapping system 310 and/or web server 320 within system 300. Accordingly, in some embodiments, recipe mapping system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can include the Virtual Retinal Display™ product, or similar product by the University of Washington of Seattle, Washington, United States of America. Meanwhile, in further specific examples, a limb mountable wearable user computer device can include the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, recipe mapping system 310 and/or web server 320 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to recipe mapping system 310 and/or web server 320, in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of recipe mapping system 310 and/or web server 320. In a similar manner, the processors and/or the non-transitory computer-readable media can be local and/or remote to each other.

Meanwhile, in many embodiments, recipe mapping system 310 and/or web server 320 also can be configured to communicate with and/or include one or more databases and/or other suitable databases. The one or more databases can include a product database that contains information about products, items, or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit, or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between recipe mapping system 310 and/or web server 320, and/or the one or more databases, can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments, recipe mapping system 310 can be a general-purpose computer or a special-purpose computer programmed to perform specific functions and/or applications. For example, recommendation server 310 can perform one or more machine learned predictive basket models to determine a set of items to recommend to a user (e.g., 350-351) with a high level of confidence that the user will select all of the items in the set of items. In some embodiments, recipe mapping system 310 can perform modifying and/or updating a probability of re-ordering each of the items previously ordered by the user. In several embodiments, the probability of re-ordering a set of items, based on one or more machine learned predictive basket models, can be for a specific period of time. In many embodiments, the probability of re-ordering a set of items can depend on whether each item of the set of items exceeds a predetermined threshold and/or a predetermined re-order likelihood score before the item can be included in the set of items for a particular time period. In various embodiments, the set of items to recommend to a user (e.g., 350-351) for a period of time can be modified and/or updated each time the user visits the page (e.g., webpage) and/or automatically updated during another suitable period of time.

Figure 4:
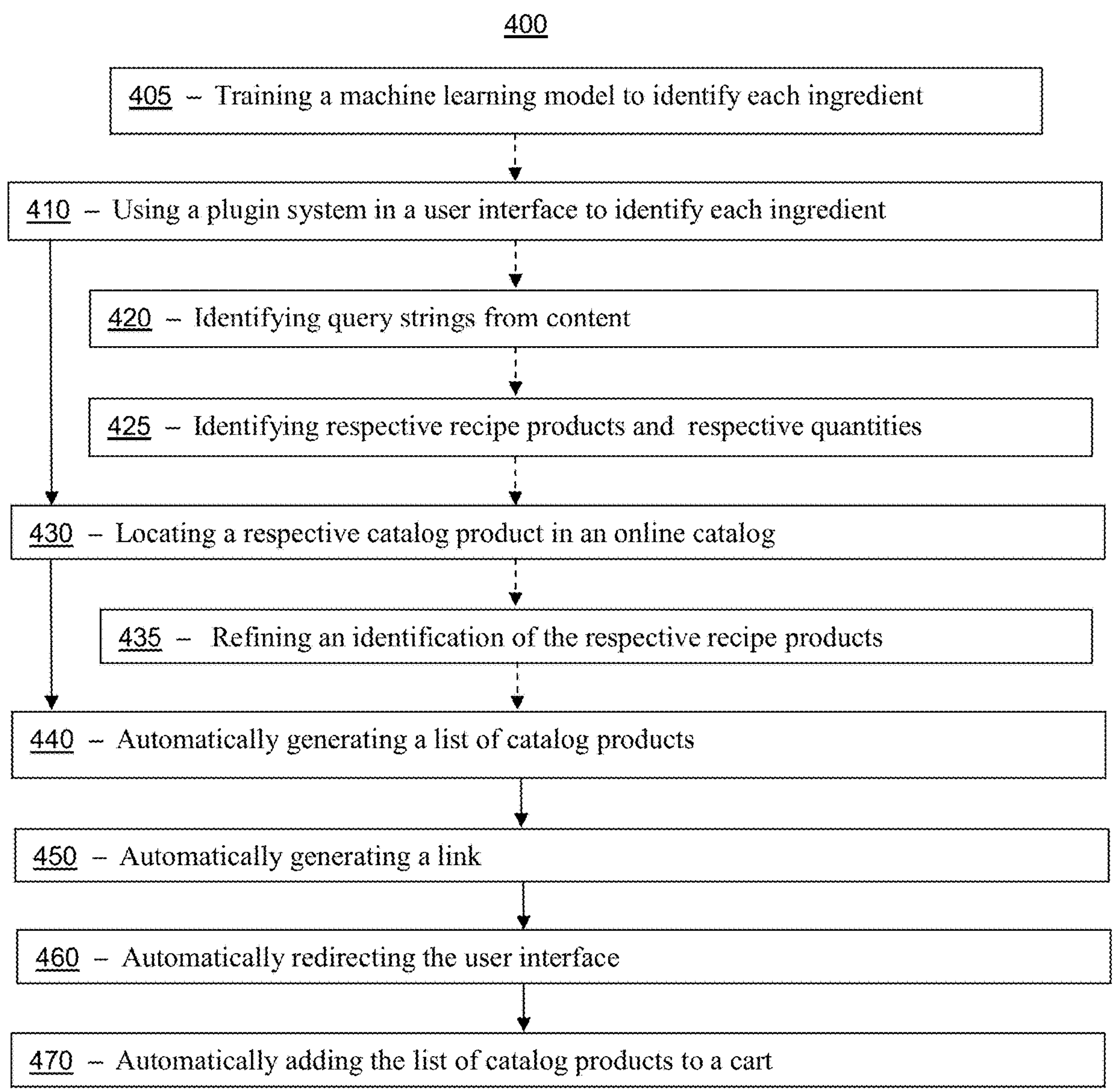
FIG. 4 illustrates a flow chart for a method, according to another embodiment.

Turning ahead in the drawings, FIG. 4 illustrates a flow chart for a method 400, according to another embodiment. In some embodiments, method 400 can be a method for mapping an ingredient in a recipe from a website to a corresponding size of a product from a catalog, according to an embodiment. In many embodiments, the recipe selected from on a website can include a video on a website, such as a video demonstrating an approach in preparing the recipe programmed with closed caption subtitles. In some embodiments, an ingredient-to-product mapping approach can include (i) extracting data from a webpage related to a recipe, (ii) identifying a product in a query string of an ingredient listed on the webpage, and (iii) mapping a list of products by size corresponding each ingredient and quantity listed on the recipe. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as recipe mapping system 310 and/or web server 320. The processor(s) can be similar or identical to the processor(s) described above with respect to computer system 100 (FIG. 1).

Referring to FIG. 4, method 400 can include an optional block 405 of training a machine learning model to identify each of the one or more ingredients from the query string. In many embodiments, input data for the machine learning model can include respective extracted partial text phrases from query strings matching respective ingredients of the one or more ingredients and respective quantities for the respective ingredients.

In several embodiments, generating output for the machine learning model can use the machine learning model, as trained, to provide predictive indications of a respective recipe product of the one or more respective recipe products for each of the query strings, and a respective quantity of each respective recipe product.

In some embodiments, the machine learning model can include a core Named Entity Recognition (NER) machine learning model. In several embodiments, training the NER machine learning model also can include generating a product matching an ingredient of a recipe.

In many embodiments, method 400 also can include a block 410 of using a plugin system in a user interface to identify each ingredient in an ingredient list of a recipe published on a webpage shown on the user interface. In several embodiments, the plugin system can be installed on a browser or other user interface of a user device and/or other suitable computer devices. In some embodiments, the plugin system can include identifying a webpage domain to initiate the ingredient-to-product mapping approach. In many embodiments, identifying each ingredient in an ingredient list of a recipe published on a webpage can include scanning a hypertext markup language (HTML) page.

In various embodiments, the webpage includes content, which can include text for the receipt. In the same or different embodiments, the content on the webpage can include a video. In some embodiments, the content on the webpage can include a transcript of the audio portion of the video. In the same or different embodiments, the video can include a closed-caption feature, and the closed-caption feature can include subtitles. In some embodiments, turning on the closed-caption feature on a video automatically triggers the plugin (previously installed on the user interface) to initiate the ingredient-to-product mapping approach. In many embodiments, triggering the plugin to initiate the ingredient-to-product mapping approach can include capturing an application programming interface (API) call (e.g., an API GET call) to the video on the website. In some embodiments, triggering the plugin to initiate the ingredient-to-product mapping approach can include cloning and sending an API GET call by using browser credentials approved for the plugin. In several embodiments, the API GET call or a related API can be used to receive an extensible markup language (XML) document.

In many embodiments, displaying subtitles from a closed-caption feature on the video can include a transcript of the video. In some embodiments, the transcript of the video also can include the XML document. In several embodiments the XML document can include the video transcription based on the closed captions. In several embodiments, the webpage further can include a retail webpage, an affiliate webpage, and/or a third-party webpage. In some embodiments, the retail webpage can be a webpage of a retailer that performs method 400 and/or that offers the online catalog of block 430 below. In other embodiments, the affiliate webpage can be a webpage of an affiliate of a retailer that performs method 400 and/or that offers the online catalog of block 430 below. In further embodiments, the third-party webpage can be a webpage of a third party of a retailer that performs method 400 and/or that offers the online catalog of block 430 below. In other embodiments, the entity that performs all or part of method 400 can be separate from the retailer that offers the online catalog of block 430 below.

In a number of embodiments, method 400 further can include an optional block 420 of identifying query strings from content on the webpage associated with one or more ingredients of the recipe. In many embodiments, block 420 also can include identifying the query strings from content on the webpage associated with one or more ingredients of the recipe that can include parsing one or more text phrases, text paragraphs and/or other suitable lengths of text from the XML document. In some embodiments, identifying each ingredient in the ingredient list of the recipe published on a webpage can include parsing the document object model (DOM) of the website to access content on the webpage. In many embodiments, parsing the DOM can include parsing XML or HTML source code from a text string and/or other suitable source code.

In a number of embodiments, method 400 additionally can include an optional block 425 of identifying one or more respective recipe products and a respective quantity for each of the one or more respective recipe products for each of the one or more ingredients. In certain embodiments, blocks 420 and 425 can be substeps or portions of block 410. In various embodiments, identifying the query strings can include extracting one line of ingredients at a time from the webpage as query string (e.g., a text string). For example, a query string extracted from a line from a recipe for Maple Bacon Mashed Potatoes states "2 lb russet potato, peeled and cut into 2 in pieces (5 cm)." In many embodiments, a query string can include one or more ingredients for the recipe and also can include a unit of measure for the ingredient. In the example above, the ingredient (e.g., potatoes) and the unit of measure of the ingredient (e.g., two (2) pounds) can be extracted from the query string.

In some embodiments, passing the extracted query string to a recipe server, such as an affiliate server and/or another suitable server, can include using a machine learning model, as trained, to generate predictive indications of one or more recipe products and a corresponding quantity of the recipe product, such as using a Cortex_Fork_Model. For example, a machine learning model can generate a predictive indication identifying the product within the query line, such as "potato peeled," based on the input from an extracted query string, such as "2 lb russet potato, peeled and cut into 2 in pieces (5 cm)," as explained via in FIG. 7 and described below.

In various embodiments, method 400 also can include a block of 430 of locating a respective catalog product in an online catalog for each of the one or more respective recipe products based on the respective quantity for each of the one or more respective recipe products. In various embodiments, the locating activity of block 430 can occur automatically after block 410 and/or its substeps of blocks 420 and/or 425. In many embodiments, locating a respective catalog product in an online catalog for each of the one or more respective recipe products can include searching a catalog (e.g., a master product list) by the product generated by the machine learning model, as trained. In some embodiments, receiving a list of products matching the machine learning model results can include finding a list of top "n" results.

In several embodiments, locating the respective catalog product in the online catalog for each of the one or more respective recipe products via block 430 can include using an n-gram learning model to match keywords (parsed from the one or more text phrases from the XML document) to the respective catalog products in the online catalog. In some embodiments, using the n-gram learning model can include refining a search term of a product when the search term does not exist in a catalog (e.g., a master product list). In many embodiments, using the n-gram learning model can include applying the n-gram learning model to paragraphs extracted from the XML document and checking the catalog for products matching an n-gram.

In various embodiments, a product result from the machine learning model can be imperfect, such as "potato peeled," when the ingredient extracted from a query string is for "russet potatoes." For example, an API search of a product catalog using "potato peeled" can yield a top result of "peeled baby-cut carrots," instead of "potatoes peeled," indicating that "potato peeled" as a search term does not exist in the catalog. In some embodiments, refining the product result from the machine learning model can include using an n-gram approach to identify a product before searching the catalog for the product matching the ingredient.

In many embodiments, method 400 also can include an optional block 435 of refining an identification of the one or more respective recipe products by using an n-gram learning model. In various embodiments, block 435 can be a substep or a portion of block 430. In a number of embodiments, refining an identification of the one or more respective recipe products by using an n-gram learning model can be performed when the respective catalog product is not identified in the online catalog. In several embodiments, using an n-gram learning model can further include creating one or more n-grams from the query string. In some embodiments, using an n-gram learning model can further include searching the online catalog using each respective n-gram as a search query to identify a respective catalog product in the online catalog.

For example, continuing with the above example, an n-gram search using the term "potato peeled" where n=2 indicates that a first search of the catalog indicates that "potato peeled" does not exist as a product in the catalog. Next, the n-gram search can use n=1 for each word "potato" and "peeled". If n=1 for "potato" exists in the catalog, then use that term as a search query. If n=1 for "peeled" does not exist in the catalog, then drop or ignore that term. Since n=1 for potato exists as a product in the catalog, the refined search query can be "2 lbs potato" with a top search result of "Simply Perfect Russet Potatoes."

In some embodiments, method 400 further can include a block 440 of automatically generating a list of catalog products based on the respective catalog products, as located. In several embodiments, generating a list of catalog products can be based on determining a corresponding product and size of the product matching each ingredient and unit of measure of the complete recipe.

In several embodiments, method 400 additionally can include a block 450 of automatically generating a link comprising the list of catalog products. As an example, the link can be a hypertext link or hyperlink. In many embodiments, generating a link can include listing product data, such as offer identifications (e.g., prices), stock keeping units (SKUs), and quantities of products of the list of products to order for the recipe. In some embodiments, the link can be a deeplink. In many embodiments, a deeplink can include a hypertext link to a webpage, and the term "deep" can refer to a hierarchical structure of a webpage or website, such that a deeplink would not necessarily bring the user to a homepage of website but rather a deeper page within the website (e.g., a subpage of the website). In many embodiments, a link and/or a deeplink can be created from the plugin and/or another suitable computer program.

In a number of embodiments, method 400 also can include a block 460 of automatically redirecting the user interface, via the link and the plugin system, to an online retail website comprising the online catalog. In many embodiments, the plugin system can transfer the list of products for a recipe directly to an online ecommerce website for a user.

In various embodiments, method 400 further can include a block 470 of automatically adding the list of catalog products to an electronic shopping cart. In this way, method 400 can automatically bring a user from a webpage showing the recipe directly to a checkout page of an ecommerce website to make it easier for a user to purchase ingredients for the recipe. In other embodiments, method 400 can automatically bring the user from the webpage showing the recipe directly a webpage on the ecommerce website that show an electronic shopping cart filled with all of the ingredients for the recipe.

Figure 5:
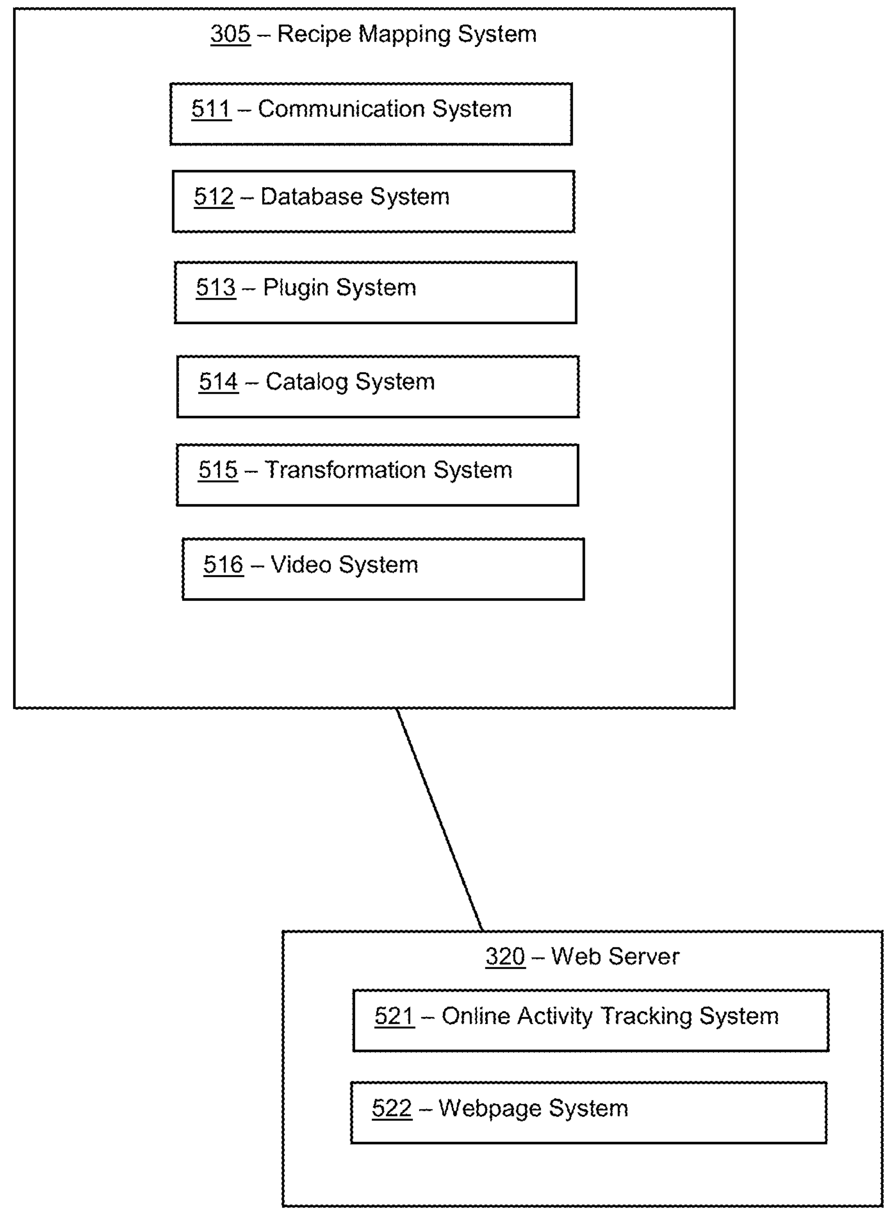
FIG. 5 illustrates a representative block diagram for the system of FIG. 3.

Turning to the next drawing, FIG. 5 illustrates a block diagram of system 300, according to the embodiment shown in FIG. 3. Recipe mapping system 310 and/or web server 320 are merely exemplary and are not limited to the embodiments presented herein. Recipe mapping system 310 and/or web server 320 can be employed in many different embodiments or examples not specifically depicted or described herein. In some embodiments, certain elements or systems of recipe mapping system 310 and/or web server 320 can perform various procedures, processes, and/or acts. In other embodiments, the procedures, processes, and/or acts can be performed by other suitable elements or systems. In many embodiments, the systems of recipe mapping system 310 and/or web server 320 can be modules of computing instructions (e.g., software modules) stored at non-transitory computer readable media. In other embodiments, the systems of recipe mapping system 310 and/or web server 320 can be implemented in hardware.

In many embodiments, recipe mapping system 310 can include a communication system 511. In a number of embodiments, communication system 511 can at least partially perform block 410 (FIG. 4) of using a plugin system in a user interface to identify each ingredient in an ingredient list of a recipe published on a webpage shown on the user interface; block 460 (FIG. 4) of automatically redirecting the user interface, via the link and the plugin system, to an online retail website comprising the online catalog, block 701 (FIG. 7, described below) of browsing a user interface of a user device for a recipe published on a webpage, block 707 (FIG. 7, described below) of redirecting the user to a login page of the homepage of the online website, block 708 (FIG. 7, described below) of adding the list of products to an electronic cart of an account of the user to the online website, block 901 (FIG. 9, described below) of initiating the plugin on the user device by selecting the closed caption feature for the video and/or block 902 (FIG. 9, described below) of extracting the ingredients of a recipe parsed from an XML document.

In several embodiments, recipe mapping system 310 also can include a database system 512. In various embodiments, database system 512 can at least partially perform block 430 (FIG. 4) of locating a respective catalog product in an online catalog for each of the one or more respective recipe products based on the respective quantity for each of the one or more respective recipe products and/or block 705 (FIG. 7, described below) of storing the search results matching a size of a product with an ingredient and quantity for the recipe.

In some embodiments, recipe mapping system 310 also can include a plugin system 513. In many embodiments, plugin system 513 can at least partially perform block 410 (FIG. 4) of using a plugin system in a user interface to identify each ingredient in an ingredient list of a recipe published on a webpage shown on the user interface, block 420 (FIG. 4) of identifying query strings from content on the webpage associated with one or more ingredients of the recipe, block 425 (FIG. 4) of identifying one or more respective recipe products and a respective quantity for each of the one or more respective recipe products for each of the one or more ingredients, block 440 (FIG. 4) of automatically generating a list of catalog products based on the respective catalog products, as located, block 460 (FIG. 4) of automatically redirecting the user interface, via the link and the plugin system, to an online retail website comprising the online catalog, block 470 (FIG. 4) of automatically adding the list of catalog products to an electronic shopping cart and/or block 708 (FIG. 7, described below) of adding the list of products to an electronic cart of an account of the user to the online website.

In some embodiments, recipe mapping system 310 also can include a catalog system 514. In several embodiments, catalog system 514 can at least partially perform block 430 (FIG. 4) of locating a respective catalog product in an online catalog for each of the one or more respective recipe products based on the respective quantity for each of the one or more respective recipe products In some embodiments, recipe mapping system 310 also can include a transformation system 515. In several embodiments, transformation system 515 can at least partially perform block 405 (FIG. 5) of training, a machine learning model, to identify each of the one or more ingredients from the query string, block 435 of refining an identification of the one or more respective recipe products by using an n-gram learning model, block 440 (FIG. 4) of automatically generating a list of catalog products based on the respective catalog products, as located, block 702 (FIG. 7, described below) of retrieving extracted text from a row of an ingredient list of a recipe published on a webpage, block 703 (FIG. 7, described below) of generating, using a machine learning model, predictive indications of a recipe product and quantity based on the extracted text from the row of the ingredient list, block 704 (FIG. 7, described below) of searching for a corresponding size of a product that matches the ingredient and quantity of the recipe and/or block 706 (FIG. 7, described below) of redirecting a server with the link (e.g., deeplink) via the plugin to homepage of an online website.

In some embodiments, recipe mapping system 310 also can include a video system 516. In several embodiments, video system 516 can at least partially perform block 410 (FIG. 4) of using a plugin system in a user interface to identify each ingredient in an ingredient list of a recipe published on a webpage shown on the user interface when the webpage displays a video and the content includes subtitles from a closed-caption feature on the video, block 901 (FIG. 9, described below) of initiating the plugin on the user device by selecting the closed caption feature for the video and/or block 902 (FIG. 9, described below) of extracting the ingredients of a recipe parsed from an XML document using an n-gram application.

In a number of embodiments, web server 320 can include an online activity tracking system 521. In many embodiments, online activity tracking system 521 can at least partially perform gathering information regarding online orders that is provided to communication system 511 and plugin system 513.

In several embodiments, web server 320 can include a webpage system 522. Webpage system 522 can at least partially perform sending instructions to user computers (e.g., 350-351 (FIG. 3)) based on information received from communication system 511.

Figure 6:
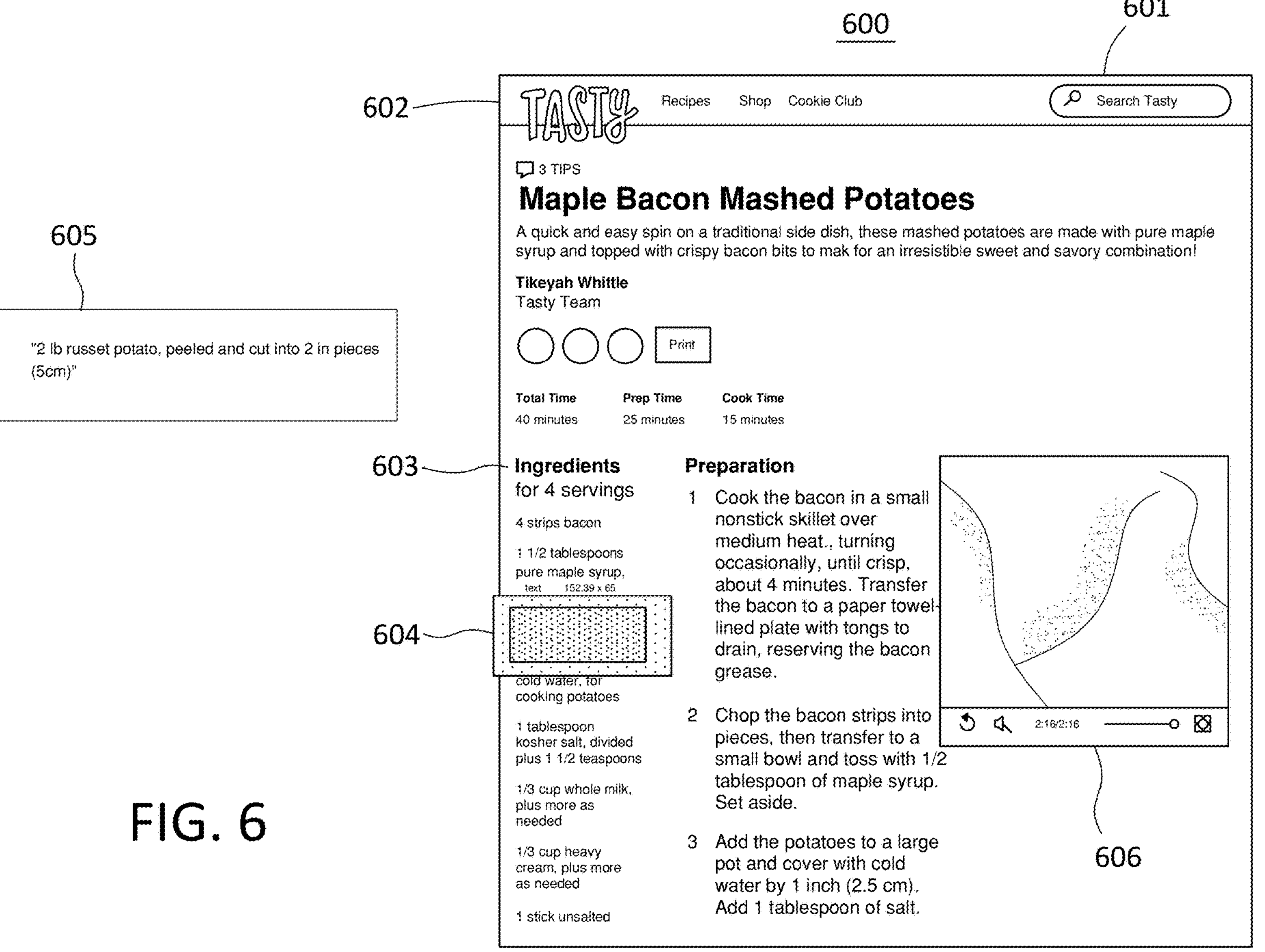
FIG. 6 illustrates an exemplary user interface showing a webpage of a website.

Turning ahead in the drawings, FIG. 6 illustrates an exemplary user interface display 600 showing a webpage of a website. User interface display 600 is merely exemplary, and embodiments of ingredient-to-product mapping for online items can be employed in many different embodiments or examples not specifically depicted or described herein. In several embodiments, user interface display 600 can include a recipe page 601, a search bar 602, a video 606, a list 603 of ingredients of the recipe, a row 604 of the recipe, and/or a line 605 of the recipe.

In various embodiments, recipe page 601 can indicate that the user has located a recipe published on a webpage on a website. In many embodiments, the webpage uploaded from the website can include a third party website, an affiliate website, a website of the retailer, and/or other suitable websites. In several embodiments, a user can activate (e.g., initiate) the plugin on a Brower or other user interface on a user device to start the process of the ingredient-to-product mapping approach for the selected recipe.

In several embodiments search bar 602 can indicate that the user has engaged in a search for recipes on the website and selected a recipe as the intended recipe for the ingredient-to-product mapping approach. In several embodiments, search bar 602 can include a plugin on a user interface programmed to implement the ingredient-to-mapping approach of receiving a list of ingredients for the recipe.

In many embodiments, list 603 of ingredients of the recipe can indicate the text of each ingredient and accompanying unit measure for extraction as query strings.

In some embodiments, row 604 of the recipe can indicate the user has initiated the plugin to begin the ingredient-to-mapping approach. In many embodiments, the plugin has selected a row of text in the ingredient list. In several embodiments, extracting one or more products and the accompanying one or more units of measure can include processing the extracted terms using a machine learning model, as trained. In many embodiments, as explained above, selecting the row of text using the plugin can include an iterative process for each row until the complete list of ingredients have been selected.

In several embodiments, line 605 of the recipe can indicate the line of text selected by the plugin for processing. In many embodiments, line 605 is an enlarged view of a line in the recipe page as shown in recipe page 601. For example, a line of an ingredient on a recipe published on a webpage can include “2 lb russet potato, peeled and cut into 2 pieces (5 cm).”

In various embodiments, video 606 on recipe page 601 contains a video of the preparation of the receipt. As noted above, the video can have a closed-captioning feature. Furthermore, although not shown in FIG. 6, recipe page 601 also can include a transcript of the audio portion of video 606. The transcript can be in addition to or in place of the closed-captioning feature of video 606.

Figure 7:
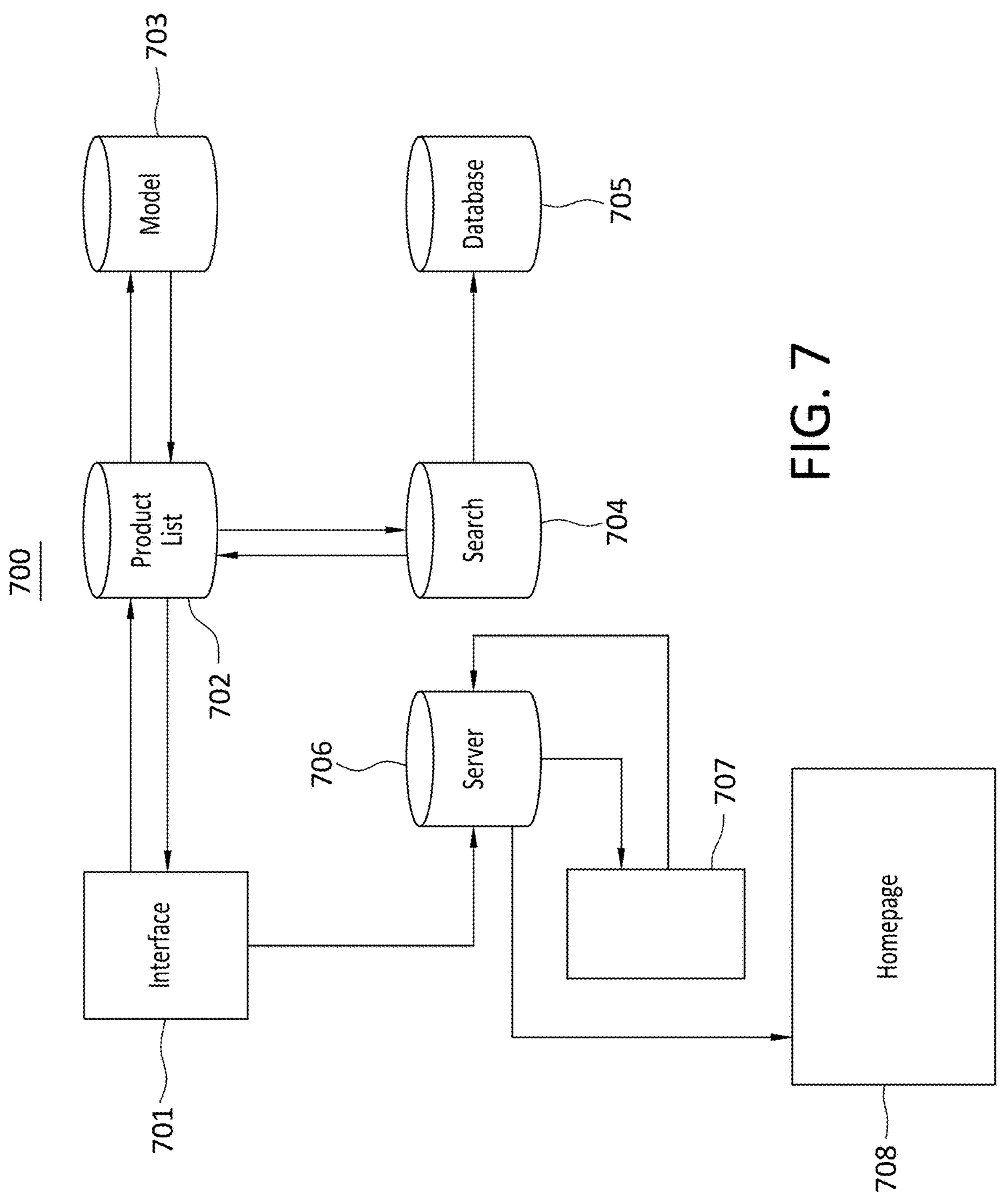
FIG. 7 illustrates a flow diagram for a method according to an embodiment.

Turning ahead in the drawings, FIG. 7 illustrates a flow chart of method 700, according to another embodiment. Method 700 can be similar to method 400 (FIG. 4) and/or method 900 (FIG. 9, as described below), and various procedures, processes, and/or activities of method 700 can be similar or identical to various procedures, processes, and/or activities of method 400 (FIG. 4), method 900 (FIG. 9), and/or method 700 (FIG. 6). Method 700 can be employed in many different embodiments and/or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped. In several embodiments, system 300 (FIG. 3) can be suitable to perform method 700 and/or one or more of the activities of method 700. In these or other embodiments, one or more of the activities of method 700 can be implemented as one or more computing instructions configured to run at one or more processors and configured to be stored at one or more non-transitory computer-readable media. Such non-transitory computer-readable media can be part of a computer system such as recipe mapping system 310 and/or web server 320. The processor(s) can be similar or identical to the processor(s) described above with respect to computer system 100 (FIG. 1).

In many embodiments, method 700 can include a block 701 of browsing a user interface of a user device for a recipe published on a webpage. In some embodiments a plugin can scan an HTML page to parse the DOM of each line of the recipe on the webpage. In various embodiments, extracting the products from the query can include sending the text to a recipe server.

In several embodiments, method 700 also can include a block 702 of retrieving extracted text from a row of an ingredient list of a recipe published on a webpage. In many embodiments, a recipe server can be an affiliate recipe server. In some embodiments, the recipe server can include a master product list (e.g., a product catalog) used to determine whether the ingredient extracted from the query text exists in the master product list.

In some embodiments, method 700 further can include a block 703 of generating, using a machine learning model, predictive indications of a recipe product and quantity based on the extracted text from the row of the ingredient list. In many embodiments, the extracted text from the query can be used as input data into the machine learning model. In several embodiments, predictive indications of a recipe product can include using the indications as search query terms to search the master product list for a matching product and quantity.

In a number of embodiments, method 700 also can include a block 704 of searching for a corresponding size of a product that matches the ingredient and quantity of the recipe. In many embodiments, searching the master list using search terms received from the machine learning model and/or refined by an n-gram search can include producing top "n" results of products and quantities.

In various embodiments, method 700 further can include a block 705 of storing the search results matching a size of a product with an ingredient and quantity for the recipe. In some embodiments, the top "n" results of the search can include sending the top result from the search as the product matching the ingredient of the recipe. In several embodiments, sending the top result from the search as the matching product to the ingredient of the recipe can include rendering the products and quantities for the recipe in the plugin.

In many embodiments, method 700 also can include a block 706 of redirecting a server with the link (e.g., a deeplink) via the plugin to homepage or other webpage of an online website.

In several embodiments, method 700 additionally can include an optional block 707 of redirecting the user to a login page of the homepage of the online website when a browser or other user interface of a user device does not include a customer identification (CID) number to automatically login to the homepage of an online website.

In some embodiments, method 700 further can include a block 708 of adding the list of products to an electronic cart of an account of the user to the online website.

Figure 8:
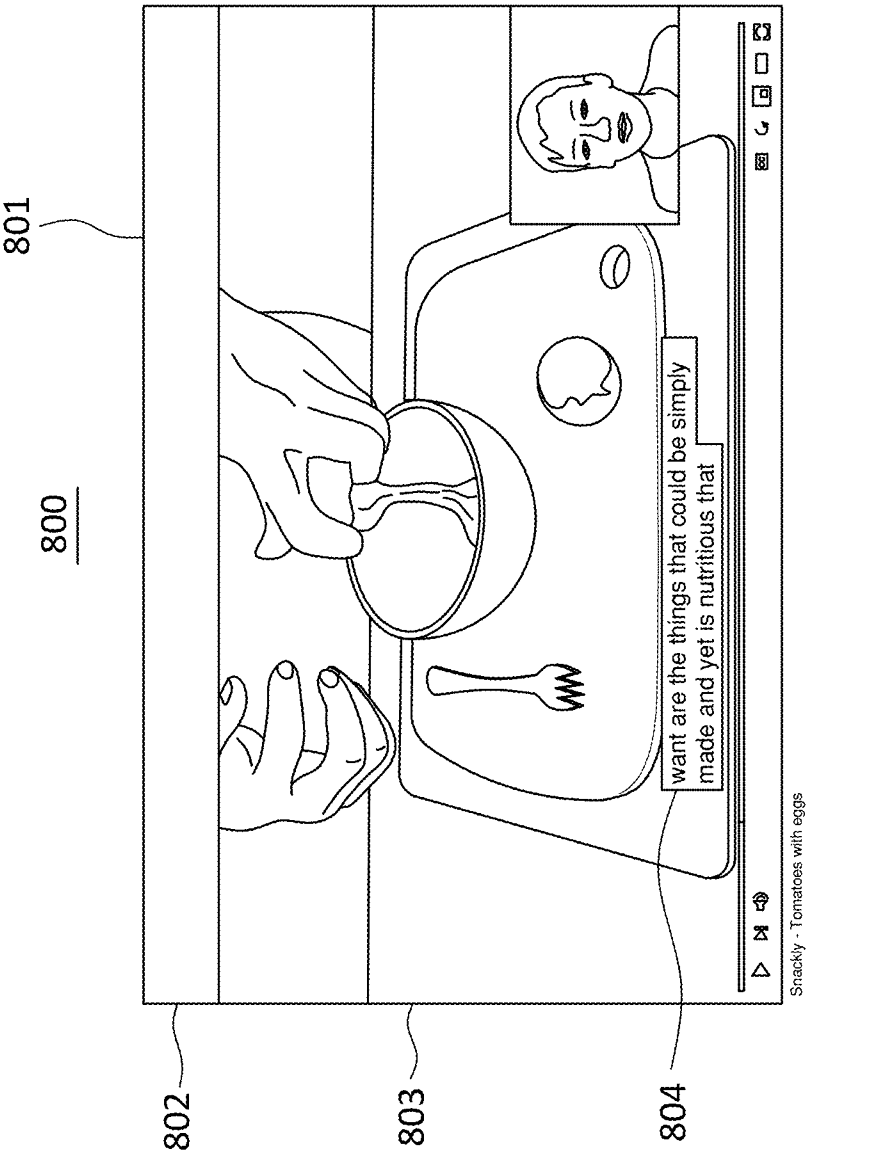
FIG. 8 illustrates an exemplary user interface showing a webpage of a website.

Turning ahead in the drawings, FIG. 8 illustrates an exemplary user interface display 800 showing a webpage of a website. User interface display 800 is merely exemplary, and embodiments of ingredient-to-product mapping for online items can be employed in many different embodiments or examples not specifically depicted or described herein. In several embodiments, user interface display 800 can include a video on webpage 801, a search bar 802, a video interface 803, and/or a subtitle bar 804.

In several embodiments, video on webpage 801 can indicate a video demonstrating a preparation of a recipe running on a website programmed to display closed captioned subtitles selected by the user.

In many embodiments, search bar 802 can indicate that the user has engaged in a search for videos demonstrating preparation of recipes on the website and selected a recipe as used in the video as the intended recipe for the ingredient-to-product mapping approach. In several embodiments, search bar 802 can include a plugin on a user interface programmed to implement the ingredient-to-mapping approach of receiving a list of ingredients for the recipe.

In various embodiments, video interface 803 can indicate that the user has selected to initiate the ingredient-to-mapping approach of receiving a list of ingredients for the recipe by programming the closed caption feature displayed on the video as subtitles. In many embodiments, activating the closed caption feature automatically initiates the plugin to begin the ingredient-to-mapping approach for the user on the selected video.

In several embodiments, subtitle bar 804 can indicate that upon activation of the plugin, the XML document can include transcriptions of the subtitles of the video via the closed caption feature to permit capturing of the list of ingredients for the recipe.

Figure 9:
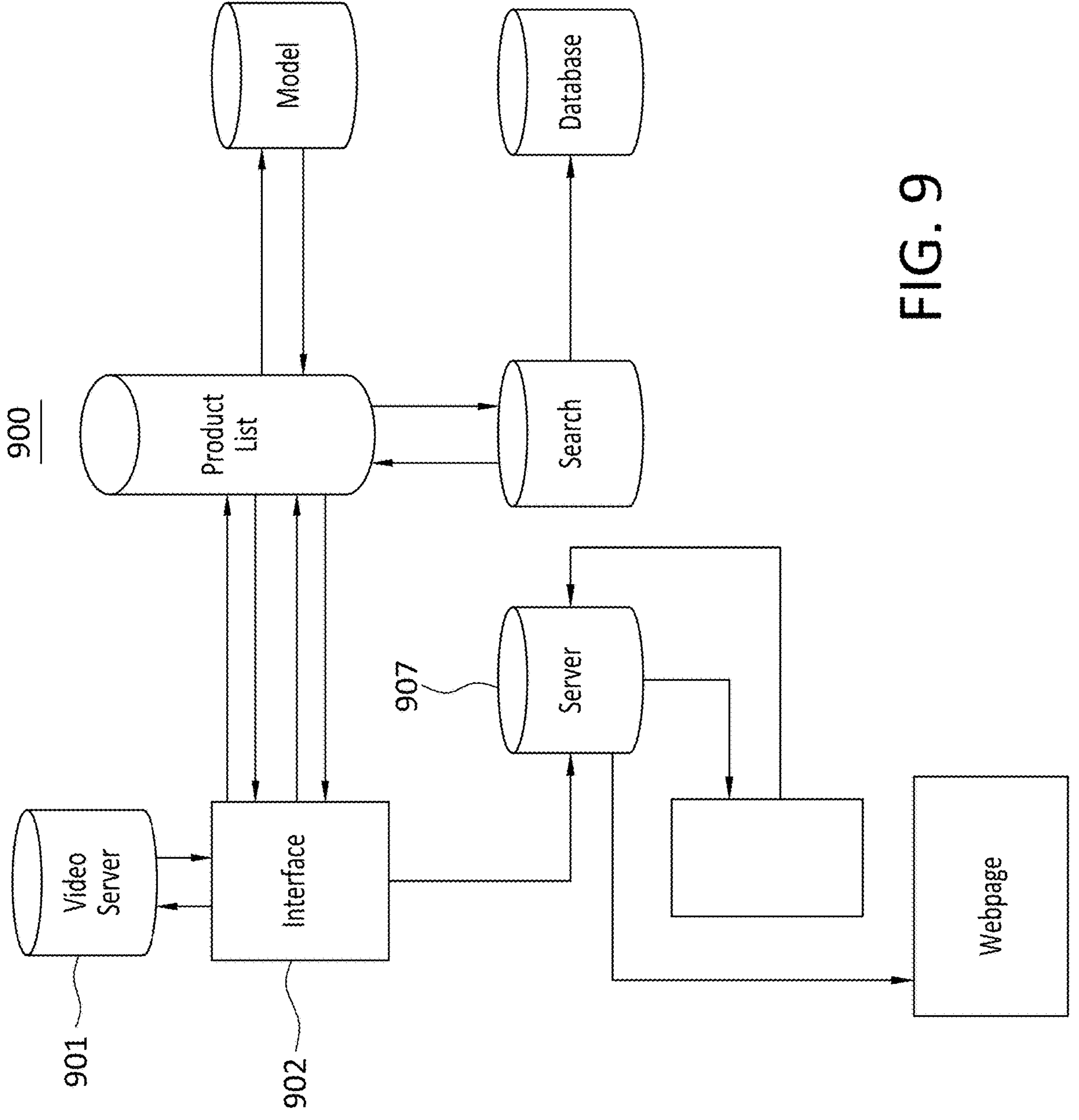
FIG. 9 illustrates a flow diagram for a method according to an embodiment.

Turning ahead in the drawings, FIG. 9 illustrates a flow chart of method 900, according to another embodiment. Method 900 can be similar to method 400 (FIG. 4) and/or method 700 (FIG. 7), and various procedures, processes, and/or activities of method 900 can be similar or identical to various procedures, processes, and/or activities of method 400 (FIG. 4), method 700 (FIG. 7), and/or method 700 (FIG. 6). Method 900 can be employed in many different embodiments and/or examples not specifically depicted or described herein. In some embodiments, the procedures, the processes, and/or the activities of method 900 can be performed in the order presented. In other embodiments, the procedures, the processes, and/or the activities of method 900 can be performed in any suitable order. In still other embodiments, one or more of the procedures, the processes, and/or the activities of method 900 can be combined or skipped. In several embodiments, system 300 (FIG. 3) can be suitable to perform method 900 and/or one or more of the activities of method 900. In these or other embodiments, one or more of the activities of method 900 can be implemented as one or more computing instructions configured to run at one or more processors and configured to be stored at one or more non-transitory computer-readable media. Such non-transitory computer-readable media can be part of a computer system such as recipe matching system 310 and/or web server 320. The processor(s) can be similar or identical to the processor(s) described above with respect to computer system 100 (FIG. 1).

In various embodiments, method 900 can include a block 901 of initiating the plugin on the user device by selecting the closed caption feature for the video. In several embodiments, initiating the plugin can include sending an API GET call to the video website. In some embodiments, sending an API GET call to the video website can include or automatically trigger the receipt of an XML document of the transcript of the video based on the closed captions.

In many embodiments, method 900 also can include a block 902 of extracting the ingredients of a recipe parsed from an XML document. In several embodiments, parsing the XML document can include generating a paragraph of text from the XML document with product and quantity information. In various embodiments, generating a paragraph of text from the XML document with product and quantity information can include using an n-gram application to detect corresponding products for the list of ingredients.

In many embodiments, the techniques described herein can provide several technological improvements. In some embodiments, the techniques described herein can provide for automatically determining a list of products from corresponding query texts extracted from a recipe on a website and/or a transcript of a video based on closed captions using machine learning techniques.

In a number of embodiments, the techniques described herein can advantageously provide a consistent user experience by dynamically creating a list of products from a catalog matching ingredients and units of measure for ingredients of a recipe found on a third party website and adding the list of products to an electronic cart of the user on another different online website using a plugin feature. An advantage of using the ingredient-to-product mapping approach allows the user to order sizes of products corresponding to ingredients to prepare a recipe without visiting a second website to browse an online catalog to order the ingredients. For example, an online catalog can include approximately one hundred million items and/or products at any given period of time.

In many embodiments, the techniques described herein can be used continuously at a scale that cannot be handled using manual techniques. For example, the number of daily and/or monthly visits to an online website can exceed approximately ten million and/or other suitable numbers and/or the number of products and/or items sold on the website can exceed approximately ten million (10,000,000) approximately each day.

In a number of embodiments, the techniques described herein can solve a technical problem that arises only within the realm of computer networks, as determining whether to update a product with certain derived attributes based on machine learning approaches does not exist outside the realm of computer networks. Moreover, the techniques described herein can solve a technical problem that cannot be solved outside the context of computer networks. Specifically, the machine learning techniques described herein cannot be used outside the context of computer networks, in view of a lack of data, and because a catalog, such as an online catalog, that can power and/or feed an online website that is part of the techniques described herein would not exist.

Various embodiments include a system. The system can include one or more processors and one or more non-transitory computer-readable media storing computing instructions configured to run on the one or more processors and perform certain acts. The acts can include using a plugin system in a user interface to identify each ingredient in an ingredient list of a recipe published on a webpage shown on the user interface. The acts also can include identifying query strings from content on the webpage associated with one or more ingredients of the recipe. The acts further can include identifying one or more respective recipe products and a respective quantity for each of the one or more respective recipe products for each of the one or more ingredients. The acts also can include locating a respective catalog product in an online catalog for each of the one or more respective recipe products based on the respective quantity for each of the one or more respective recipe products. The acts further can include automatically generating a list of catalog products based on the respective catalog products, as located. The acts additionally can include automatically generating a link comprising the list of catalog products. The acts also can include automatically redirecting the user interface, via the link and the plugin system, to an online retail website comprising the online catalog. The acts further can include automatically adding the list of catalog products to an electronic shopping cart.

Several embodiments can include a method. The method can be implemented via execution of computing instructions configured to run at one or more processors and stored at one or more non-transitory computer-readable media. The method can include using a plugin system in a user interface to identify each ingredient in an ingredient list of a recipe published on a webpage shown on the user interface. The method can also include identifying query strings from content on the webpage associated with one or more ingredients of the recipe. The method further can include identifying one or more respective recipe products and a respective quantity for each of the one or more respective recipe products for each of the one or more ingredients. The method additionally can include locating a respective catalog product in an online catalog for each of the one or more respective recipe products based on the respective quantity for each of the one or more respective recipe products. The method also can include automatically generating a list of catalog products based on the respective catalog products, as located. The method further can include automatically generating a link comprising the list of catalog products. The method additionally can include automatically redirecting the user interface, via the link and the plugin system, to an online retail website comprising the online catalog. The method also can include automatically adding the list of catalog products to an electronic shopping cart.

A number of embodiments can include a system. The system can include one or more processors and one or more non-transitory computer-readable media storing computing instructions that, when executed on the one or more processors, cause the one or more processors to perform certain acts. The acts can include identifying each ingredient in an ingredient list of a recipe published on a webpage. The acts further can include identifying query strings from content on the webpage associated with one or more ingredients of the recipe on the webpage. The acts also can include extracting, using an iterative process, respective ingredients from each line of text of a respective query string of the query strings of the webpage. Each respective text string of the query strings can include (a) a respective ingredient of the respective ingredients and (b) a respective quantity and a respective unit of measure for the respective ingredient. Each iteration of the iterative process runs until the respective ingredients of the recipe are selected. The acts additionally can include mapping a list of one or more respective recipe products by size corresponding to the respective quantity and the respective unit of measure for each of the respective ingredients of the recipe. The acts also can include automatically adding the list of one or more respective recipe products to an electronic shopping cart.

Some embodiments can include a method. A method being implemented via execution of computing instructions configured to run at one or more processors and stored at one or more non-transitory computer-readable media. The method can include identifying each ingredient in an ingredient list of a recipe published on a webpage. The method further can include identifying query strings from content on the webpage associated with one or more ingredients of the recipe on the webpage. The method also can include extracting, using an iterative process, respective ingredients from each line of text of a respective query string of the query strings of the webpage. Each respective text string of the query strings can include (a) a respective ingredient of the respective ingredients and (b) a respective quantity and a respective unit of measure for the respective ingredient. Each iteration of the iterative process runs until the respective ingredients of the recipe are selected. The method additionally can include mapping a list of one or more respective recipe products by size corresponding to the respective quantity and the respective unit of measure for each of the respective ingredients of the recipe. The method also can include automatically adding the list of one or more respective recipe products to an electronic shopping cart.

Several embodiments can include a system. A system can include one or more processors and one or more non-transitory computer-readable media storing computing instructions that, when executed on the one or more processors, cause the one or more processors to perform certain operations. The operations can include parsing a hypertext markup language source code from text strings of query strings of a webpage containing ingredients for a recipe. The operations further can include extracting, using an iterative process, the ingredients for the recipe from the query strings of the webpage. The operations also can include mapping recipe products based on quantities or units of measure of the ingredients, as extracted, for the recipe. The operations additionally can include automatically adding the recipe products to an electronic shopping cart.

Various embodiments can include a method. A method implemented via execution of computing instructions configured to run at one or more processors and stored at one or more non-transitory computer-readable media. The method can include parsing a hypertext markup language source code from text strings of query strings of a webpage containing ingredients for a recipe. The method further can include extracting, using an iterative process, the ingredients for the recipe from the query strings of the webpage. The method also can include mapping recipe products based on quantities or units of measure of the ingredients, as extracted, for the recipe. The method additionally can include automatically adding the recipe products to an electronic shopping cart.

Although automatically determining a list of products to order for a recipe displayed on a webpage in real-time has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 3-8 may include different procedures, processes, and/or activities and be performed by many different modules, in many different orders, and/or one or more of the procedures, processes, or activities of FIGS. 3-8 may include one or more of the procedures, processes, or activities of another different one of FIGS. 3-8. As another example, the systems within recipe mapping system 310 and/or webserver 320 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed:

1. A system comprising:

one or more processors; and one or more non-transitory computer-readable media storing computing instructions that, when executed on the one or more processors, cause the one or more processors to perform operations comprising:

parsing a document object model of a website to access content on a webpage of the website, wherein:

the content comprises ingredients for a recipe; and the parsing of the document object model comprises:

parsing a hypertext markup language source code from text strings of query strings of the webpage; and extracting, using an iterative process, the ingredients for the recipe from the query strings of the webpage;

mapping the ingredients to recipe products from an online catalog based on quantities or units of measure of the ingredients for the recipe, as extracted; and automatically adding the recipe products to an electronic shopping cart.

2. The system of claim 1, wherein:

the webpage displays a video; and the webpage comprises one or more of: (i) subtitles from a closed caption feature on the video or (ii) a transcript of the video.

3. The system of claim 1, wherein the operations further comprise:

identifying the query strings from the content comprising the ingredients for the recipe by parsing one or more text phrases from an extensible markup language (XML) document.

4. The system of claim 3, wherein each respective text string of the text strings comprises:

a respective ingredient of the ingredients; and a respective quantity of the quantities and a respective unit of measure of the units of measure for the respective ingredient.

5. The system of claim 1, wherein the operations further comprise:

automatically redirecting a user interface of a user device, via a link, to another website comprising the online catalog.

6. The system of claim 1, wherein the operations further comprise:

training a machine learning model to identify each ingredient of the ingredients from each respective query string of the query strings, wherein input data for the machine learning model comprises respective extracted partial text phrases from the query strings matching (i) respective ingredient of the ingredients and (ii) respective quantities for the respective ingredients.

7. The system of claim 6, wherein:

generating, using the machine learning model, as trained, output comprising predictive indications of (i) a respective recipe product of the recipe products for each of the query strings, and (ii) a respective quantity of each respective recipe product.

8. The system of claim 1, wherein the operations further comprise:

when a recipe product of the recipe products is not identified in the online catalog for the electronic shopping cart, refining an identification of the recipe product by using an n-gram learning model by:

creating one or more n-grams from each query string of the query strings; and searching the online catalog using each respective n-gram as a search query to identify the recipe product in the online catalog.

9. The system of claim 1, wherein the operations further comprise:

automatically triggering a user interface of a user device displaying the webpage to initiate when a closed caption feature of a video on the webpage is turned on.

10. The system of claim 9, wherein automatically triggering the user interface of the user device comprises:

capturing an application programming interface (API) call to the video on the webpage; or cloning and sending the API call by using browser credentials to automatically trigger the user interface of the user device to initiate when the closed caption feature of the video is turned on.

11. A method implemented via execution of computing instructions configured to run at one or more processors and stored at one or more non-transitory computer-readable media, the method comprising:

parsing a document object model of a website to access content on a webpage of the website, wherein:

the content comprises ingredients for a recipe; and the parsing of the document object model comprises:

parsing a hypertext markup language source code from text strings of query strings of the webpage; and extracting, using an iterative process, the ingredients for the recipe from the query strings of the webpage;

mapping the ingredients to recipe products from an online catalog based on quantities or units of measure of the ingredients for the recipe, as extracted; and automatically adding the recipe products to an electronic shopping cart.

12. The method of claim 11, wherein:

the webpage displays a video; and the webpage comprises one or more of: (i) subtitles from a closed caption feature on the video or (ii) a transcript of the video.

13. The method of claim 11, further comprising:

identifying the query strings from the content comprising the ingredients for the recipe by parsing one or more text phrases from an extensible markup language (XML) document.

14. The method of claim 13, wherein each respective text string of the text strings comprises:

a respective ingredient of the ingredients; and a respective quantity of the quantities and a respective unit of measure of the units of measure for the respective ingredient.

15. The method of claim 11 further comprising:

automatically redirecting a user interface of a user device, via a link, to another website comprising the online catalog.

16. The method of claim 11 further comprising:

training a machine learning model to identify each ingredient of the ingredients from each respective query string of the query strings, wherein input data for the machine learning model comprises respective extracted partial text phrases from the query strings matching (i) respective ingredient of the ingredients and (ii) respective quantities for the respective ingredients.

17. The method of claim 16, wherein:

generating, using the machine learning model, as trained, output comprising predictive indications of (i) a respective recipe product of the recipe products for each of the query strings, and (ii) a respective quantity of each respective recipe product.

18. The method of claim 11 further comprising:

when a recipe product of the recipe products is not identified in the online catalog for the electronic shopping cart, refining an identification of the recipe product by using an n-gram learning model by:

creating one or more n-grams from each query string of the query strings; and searching the online catalog using each respective n-gram as a search query to identify the recipe product in the online catalog.

19. The method of claim 11 further comprising:

automatically triggering a user interface of a user device displaying the webpage to initiate when a closed caption feature of a video on the webpage is turned on.

20. The method of claim 19, wherein automatically triggering the user interface of the user device comprises:

capturing an application programming interface (API) call to the video on the webpage; or cloning and sending the API call by using browser credentials to automatically trigger the user interface of the user device to initiate when the closed caption feature of the video is turned on.

* * * * *